United States Patent
Jung et al.

(10) Patent No.: US 10,333,643 B2
(45) Date of Patent: Jun. 25, 2019

(54) APPARATUS AND METHOD FOR IP BASED TRANSMISSION OF UPSTREAM RF SIGNAL IN CABLE BROADCASTING NETWORK

(71) Applicant: Electronics and Telecommunications Research Institute, Daejeon (KR)

(72) Inventors: Joon Young Jung, Daejeon (KR); Jae Ho Lee, Daejeon (KR); Dong Joon Choi, Daejeon (KR); Nam Ho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 73 days.

(21) Appl. No.: 14/959,189

(22) Filed: Dec. 4, 2015

(65) Prior Publication Data
US 2016/0164664 A1     Jun. 9, 2016

(30) Foreign Application Priority Data
Dec. 5, 2014 (KR) .................. 10-2014-0173865

(51) Int. Cl.
*H04J 3/06* (2006.01)
*H04J 14/02* (2006.01)

(52) U.S. Cl.
CPC ............ *H04J 3/0655* (2013.01); *H04J 14/02* (2013.01)

(58) Field of Classification Search
CPC ............ H04N 21/6125; H04N 21/6175; H04J 3/0655; H04J 14/02
USPC ................................................. 398/115, 66
See application file for complete search history.

(56) References Cited

U.S. PATENT DOCUMENTS

| | | | | |
|---|---|---|---|---|
| 8,396,369 B1* | 3/2013 | Farmer | ............ | H04B 10/25754 398/115 |
| 8,428,465 B2* | 4/2013 | Biegert | ................ | H04J 3/1694 398/115 |
| 2008/0310842 A1* | 12/2008 | Skrobko | .......... | H04B 10/25753 398/72 |
| 2009/0232498 A1* | 9/2009 | Tsuge | .................. | H04L 41/0226 398/58 |
| 2009/0249421 A1* | 10/2009 | Liu | ..................... | H04L 12/2801 725/116 |
| 2010/0002719 A1* | 1/2010 | Sowinski | .............. | H04J 3/1694 370/458 |

FOREIGN PATENT DOCUMENTS

KR     1020130141856 A     12/2013

\* cited by examiner

*Primary Examiner* — Will W Lin
(74) *Attorney, Agent, or Firm* — William Park & Associates Ltd.

(57) ABSTRACT

An apparatus and a method for converting an upstream radio frequency (RF) signal to a digital signal and transmitting the digital signal via an Internet protocol (IP) packet based on an optical network in a cable broadcasting network is provided. The apparatus for transmitting an upstream RF signal includes a detector configured to detect an upstream RF signal, and a transmitter configured to digitize the detected upstream RF signal and transmit the digitized RF signal to a headend via an IP packet.

9 Claims, 7 Drawing Sheets

APPARATUS AND METHOD FOR IP BASED TRANSMISSION OF UPSTREAM RF SIGNAL IN CABLE BROADCASTING NETWORK

CROSS-REFERENCE TO RELATED APPLICATION

This application claims the priority benefit of Korean Patent Application No. 10-2014-0173865, filed on Dec. 5, 2014, in the Korean Intellectual Property Office, the disclosure of which is incorporated herein by reference.

BACKGROUND

1. Field of the Invention

Embodiments relate to technology for converting an analog upstream radio frequency (RF) signal to a digital signal and transmitting the digital signal via an Internet protocol (IP) packet, based on an optical network in a cable broadcasting network.

2. Description of the Related Art

A cable broadcasting network refers to a network configured as a hybrid fiber coaxial (HFC) network, and through which a signal is transferred from a broadcaster to the neighborhood of a customer premises via an optical cable, and the optical signal is converted to an electrical signal in an optical network unit (ONU) and transferred to each customer premises via a coaxial cable. The cable broadcasting network has media characteristics that enable an interactive service such as the Internet using a cable modem and a voice of Internet protocol (VoIP), in addition to a one-way service of transmitting simply a broadcast signal.

Recently, a cable network has evolved into a form in which an optical cable gradually increases to a close neighborhood of a customer premises and a distance of a coaxial cable is minimized, or a form in which the optical cable is directly provided to the customer premises. For example, radio frequency over glass (RFoG) technology simultaneously secures a stability of a broadcasting service and an ultrahigh speed of the Internet by transferring a cable broadcast signal via the optical cable. The RFoG technology may provide an ultrahigh-speed Internet service while maintaining a stable broadcasting quality of a cable television (TV), by transmitting an RF-type real-time cable broadcast signal via an optical cable network, for example, a fiber to the home (FTTH), in lieu of an existing HFC network for a cable broadcast.

A recent cable transmission system applies such an RFoG technology to allow a cable broadcasting network to be connected from a headend to a customer premises via an optical cable. In general, a broadcasting and communication service may be transferred via an RF signal in a cable broadcasting network.

However, the RFoG technology may incur a significant amount of costs for construction. In an RFoG device located on a customer premises, a price of a component of the device used for modulating an upstream RF signal to an optical signal takes a large portion of a total cost for implementing the RFoG device. Such a cost issue may deter the proliferation of the RFoG construction.

SUMMARY

According to an aspect, there is provided an apparatus for transmitting an upstream radio frequency (RF) signal, the apparatus including a detector configured to detect an upstream RF signal, and a transmitter configured to digitize the detected upstream RF signal and transmit the digitized RF signal to a headend via an Internet protocol (IP) packet.

The apparatus may further include a synchronizer configured to perform timing synchronization concurrently with a modulator of the headend.

The synchronizer may perform the timing synchronization using at least one of a network time protocol (NTP), a precision time protocol (PTP), and synchronous Ethernet (SyncE).

The transmitter may transmit, to the modulator of the headend, the digitized RF signal and timing information generated from the timing synchronization.

The modulator of the headend may receive the timing information, and generate and output a new RF signal to have a delay time based on the received timing information.

According to another aspect, there is provided a method of transmitting an upstream RF signal, the method including detecting an upstream RF signal, digitizing the detected upstream RF signal, and transmitting, to a headend, the digitized RF signal and timing information via an IP packet.

The method may further include performing timing synchronization concurrently with a modulator of the headend.

The performing of the timing synchronization may include performing the timing synchronization using at least one of an NTP, a PTP, and SyncE.

The transmitting may include transmitting, to the modulator of the headend, the digitized RF signal and the timing information generated from the timing synchronization.

The modulator of the headend may receive the timing information, and generate and output a new RF signal to have a delay time based on the received timing information.

According to still another aspect, there is provided an apparatus for receiving an upstream RF signal, the apparatus including a modulator configured to receive an upstream RF signal and timing information from an optical network terminal (ONT) on a customer premises and perform timing synchronization, and a cable modem termination system (CMTS) configured to process the upstream RF signal based on the timing synchronization and output a new RF signal corresponding to the processed upstream RF signal. The ONT on the customer premises may detect the upstream RF signal, digitize the detected upstream RF signal, and transmit the digitized RF signal to the modulator via an IP packet.

The ONT on the customer premises may perform the timing synchronization concurrently with the modulator.

The ONT on the customer premises may perform the timing synchronization using at least one of an NTP, a PTP, and SyncE.

The ONT on the customer premises may transmit, to the modulator, the digitized RF signal and the timing information generated from the timing synchronization.

The modulator may receive the timing information, and generate and output a new RF signal to have a delay time based on the received timing information.

According to yet another aspect, there is provided a method of receiving an upstream RF signal, the method including receiving an upstream RF signal and timing information from an ONT on a customer premises and performing timing synchronization by a modulator, and processing the upstream RF signal based on the timing synchronization and outputting a new RF signal corresponding to the processed upstream RF signal by a CMTS. The ONT on the customer premises may detect the upstream RF signal, digitize the detected upstream RF signal, and transmit the digitized RF signal to the modulator via an IP packet.

The ONT on the customer premises may perform the timing synchronization concurrently with the modulator using at least one of an NTP, a PTP, and SyncE.

The ONT on the customer premises may transmit, to the modulator, the digitized RF signal and the timing information generated from the timing synchronization.

The method may further include receiving the timing information, and generating and outputting a new RF signal to have a delay time based on the received timing information by the modulator.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

When it is determined a detailed description related to a related known function or configuration that may make the purpose of the present invention unnecessarily ambiguous in describing the present invention, the detailed description will be omitted here. Also, terms used herein are defined to appropriately describe the embodiments of the present invention and thus may be changed depending on the intent of a user or an operator, or a custom. Accordingly, the terms must be defined based on the following overall description of this specification.

Figure 1:
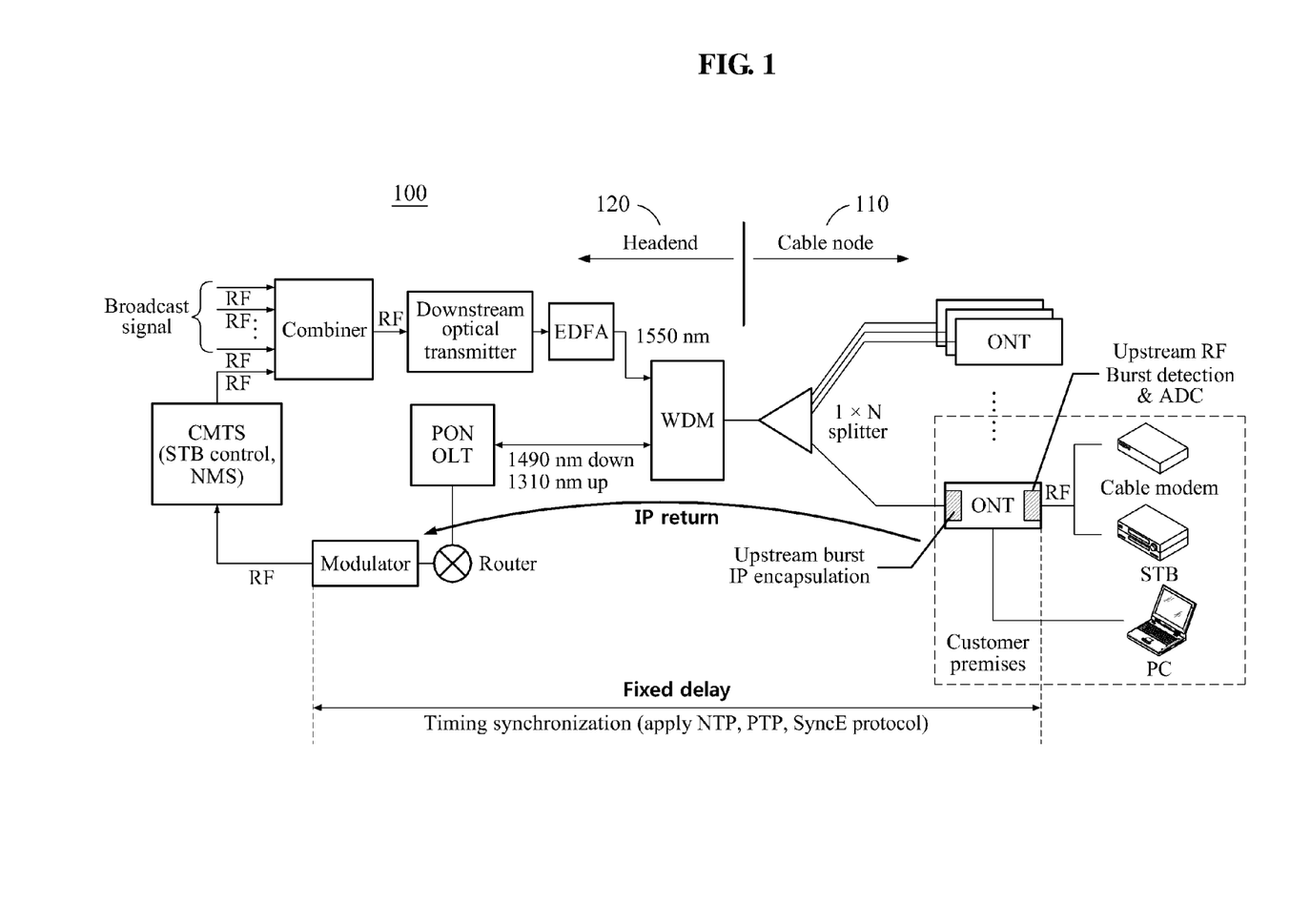
FIG. 1 is a diagram illustrating a cable broadcasting network including a headend and a cable node according to an embodiment.

FIG. 1 is a diagram illustrating a cable broadcasting network 100 including a headend 120 and a cable node 110 according to an embodiment.

According to an embodiment, Internet protocol (IP)-based transmission of an upstream radio frequency (RF) signal may be enabled. In a case of a downstream RF signal, a general RF overlay method of optically modulating an RF signal and transmitting the modulated RF signal may be applied. Also, in a case of an upstream RF signal, a method of digitizing an upstream RF signal and transmitting the digitized RF signal via an IP packet may be used. Thus, the IP-based transmission of an upstream RF signal may be performed using a passive optical network (PON) instead of optically modulating the upstream RF signal. In addition, despite a change from a cable broadcasting network to an optical cable network, an existing subscriber set-top box (STB) and RF signal-based broadcasting equipment, for example, a cable modem termination system (CMTS), used in a hybrid fiber coaxial (HFC) network may be used to reduce construction costs.

A broadcast signal and a signal to be output from the CMTS are RF signals having different center frequencies in 6 or 8 megahertz (MHz) frequency band. These signals may be combined as a signal output by a combiner, and an RF signal to be output from the combiner may be output after being input to a downstream optical transmitter. Through the input and the output, an RF electrical signal may be converted to an optical signal.

The optical signal is different from a PON type signal used in general optical communications. An optical signal used in the PON is an ON/OFF type to turn on or off an optical source based on a bit value in a bit unit, whereas the optical signal obtained by the conversion in the downstream optical transmitter is an optical amplitude modulation signal to change an intensity of an optical source with respect to an amplitude of an RF signal.

The signal converted to the optical signal may be transmitted to a splitter through an optical cable after being amplified in an erbium-doped fiber amplifier (EDFA), and the signal split at a rate of 1:N in the splitter may be input to an optical network terminal (ONT) located on each customer premises. The ONT on the customer premises may convert the optical signal to an RF signal again and transfer the RF signal to a cable modem or an STB to provide a service.

According to an embodiment, dissimilar to existing technology, a PON-based ONT or optical network unit (ONU) is located on a customer premises, and a PON-based optical line terminal (OLT) is located at a headend.

In a case of the ONT on the customer premises, in addition to a function of the ONT used for PON-based optical communications, functions of restoring an optically modulated downstream RF signal and transmitting the signal through a coaxial cable and of detecting an upstream RF signal to be output from the cable modem or the STB, digitizing the detected signal, and transmitting the digitized signal via an IP packet may be added.

According to an embodiment, the RF signal may be transmitted via a PON-based IP packet, instead of optically modulating the upstream RF signal again by a radio frequency over glass (RFoG) device and transmitting the signal. Thus, costs used for the optical modulation may be significantly reduced.

Referring to FIG. 1, IP-based transmission of an upstream RF signal is performed as follows.

When an upstream RF signal is output from a cable model and an STB, an ONT detects the output RF signal. The ONT digitizes the analog RF signal by performing analog-to-digital conversion (ADC) on the detected RF signal.

The ONT inserts the digitized RF signal in an IP packet and transmits the IP packet to the headend 120 using a PON-based protocol.

Here, the ONT may use, as the PON-based protocol, an Ethernet passive optical network (EPON) or a gigabit passive optical network (GPON).

The digitized RF signal transmitted to the headend 120 is input to a modulator after passing through an OLT and then through a device in the headend 120 connected through an IP network, for example, a router and a switch.

The modulator in the headend 120 receives the digitized RF signal and performs digital-to-analog conversion (DAC) to restore and output the original RF signal. The RF signal restored in the modulator is input to a CMTS and reception is completed. The reception is enabled in the CMTS, identically to the transmission of the RF signal output from the cable model or the STB.

Thus, a PON-based ultrahigh-speed Internet service may be enabled, and a subscriber may use a high-quality communication service through a PON rather than an existing communication service using a cable modem.

According to an embodiment, timing synchronization may be necessary between the ONT located on the customer premises of the subscriber and the modulator in the headend 120. Since upstream traffic transmission is performed through time division multiple access (TDMA), accurate timing synchronization in a network may be necessary. Thus, the timing synchronization between the ONT on the customer premises and the modulator in the headend 120 may be performed using a network synchronization protocol, for example, a network time protocol (NTP), a precision time protocol (PTP), and synchronous Ethernet (SyncE).

Timing information about a timing at which an upstream RF burst signal to be actually output from the cable modem and the STB is input to the ONT after the timing synchronization is obtained may be transferred when the RF signal is digitized and transmitted via the IP packet. The modulator in the headend 120 may receive the IP packet and verify the timing information, and generate and output an RF signal again to allow all packets to have a delay time. The CMTS may allow the cable modem or the STB to receive the upstream RF signal at an allocated time.

Figure 2:
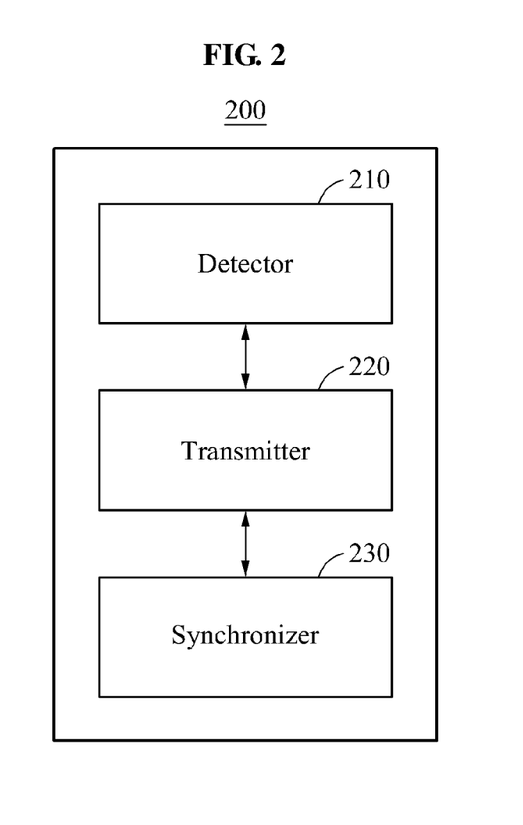
FIG. 2 is a diagram illustrating an apparatus for transmitting an upstream radio frequency (RF) signal according to an embodiment.

FIG. 2 is a diagram illustrating an apparatus for transmitting an upstream RF signal according to an embodiment. Hereinafter, the apparatus for transmitting an upstream RF signal will be simply referred to as an upstream RF signal transmitting apparatus 200.

Referring to FIG. 2, the upstream RF signal transmitting apparatus 200 includes a detector 210 and a transmitter 220.

The detector 210 detects an upstream RF signal. The transmitter 220 digitizes the detected upstream RF signal and transmits, to a headend, the digitized RF signal via an IP packet.

In addition, the upstream RF signal transmitting apparatus 200 may further include a synchronizer 230 configured to perform timing synchronization concurrently with a modulator of the headend. In one example, the synchronizer 230 may perform the timing synchronization using at least one of an NTP, a PTP, and SyncE.

The transmitter 220 transmits, along with the digitized RF signal to the modulator of the headend, timing information generated from the timing synchronization.

The modulator of the headend receives the timing information, and generates and outputs a new RF signal to have a delay time based on the received timing information.

Figure 3:
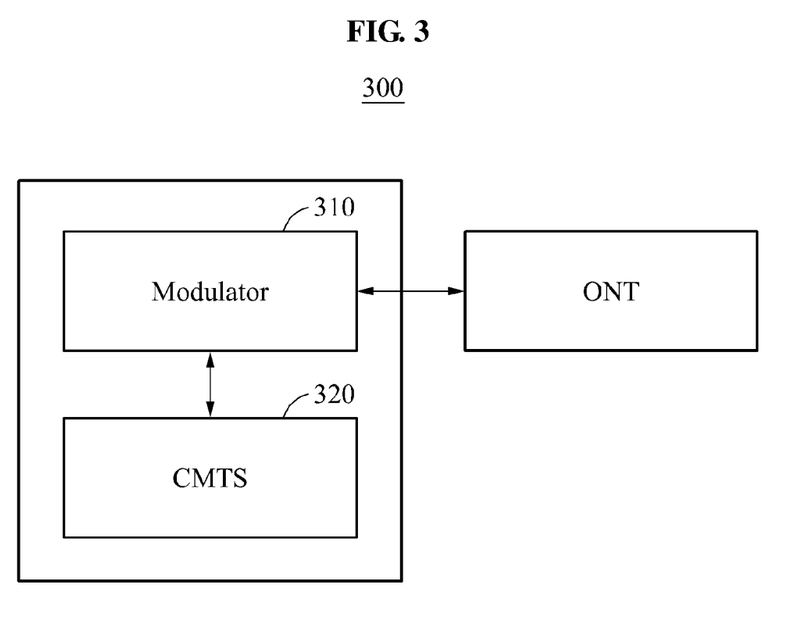
FIG. 3 is a diagram illustrating an apparatus for receiving an upstream RF signal according to an embodiment.

FIG. 3 is a diagram illustrating an apparatus for receiving an upstream RF signal according to an embodiment. Hereinafter, the apparatus for receiving an upstream RF signal will be simply referred to as an upstream RF signal receiving apparatus 300.

Referring to FIG. 3, the upstream RF signal receiving apparatus 300 includes a modulator 310 and a CMTS 320.

The modulator 310 receives, from an ONT on a customer premises, an upstream RF signal and timing information and performs timing synchronization. The CMTS 320 processes the upstream RF signal based on the timing synchronization and outputs a new RF signal corresponding to the processed RF signal. Here, the ONT on the customer premises detects the upstream RF signal, digitizes the detected upstream RF signal, and transmits the digitized RF signal via an IP packet to the modulator 310.

The ONT on the customer premises performs, concurrently with the modulator 310 of a headend, the timing synchronization using at least one of an NTP, a PTP, and SyncE. In one example, the ONT transmits, to the modulator 310 of the headend, the timing information generated from the timing synchronization, along with the digitized RF signal. The modulator 310 receives the timing information, and generates a new RF signal having a delay time based on the received timing information.

Figure 4:
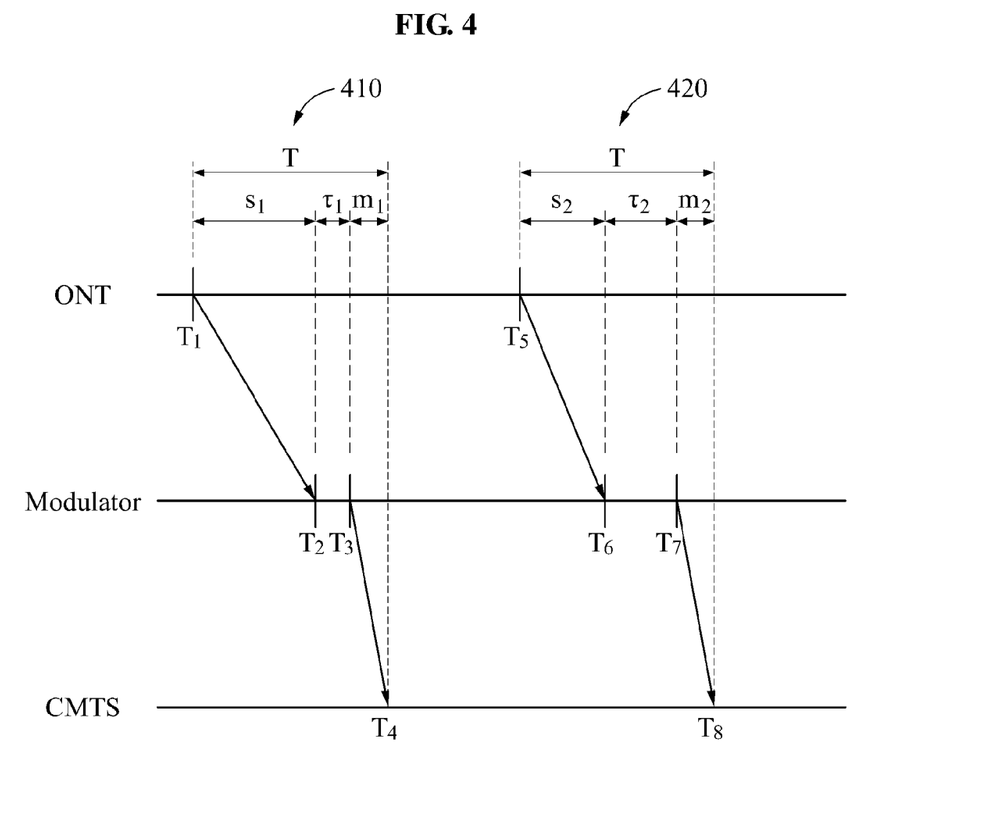
FIG. 4 illustrates a process of transmitting an upstream burst when timing synchronization is obtained between an optical network terminal (ONT) and a modulator according to an embodiment.

FIG. 4 illustrates a process of transmitting an upstream burst when timing synchronization is obtained between an ONT and a modulator according to an embodiment.

In FIG. 4, STB1 upstream burst transmission is illustrated as 410, and STB2 upstream burst transmission is illustrated as 420.

Referring to FIG. 4, "$T_1$" indicates a time at which an ONT receives an upstream RF burst signal after STB1 transmits the upstream RF burst signal. "$T_2$" indicates a time at which the RF signal arrives at a modulator of a headend after the ONT digitizes the RF signal and transmits the digitized RF signal to the headend via an IP packet. "$T_3$" indicates a time at which the RF signal is output to a CMTS from the modulator after a delay time, and "$T_4$" indicates a time at which the RF signal output from the modulator finally arrives at the CMTS. Similarly, "$T_5$" indicates a time at which the ONT receives an upstream RF burst signal after STB2 transmits the upstream RF burst signal. "$T_6$" indicates a time at which the RF signal arrives at the modulator of the headend after the ONT digitizes the RF signal and transmits the digitized RF signal to the headend via an IP packet. "$T_7$" indicates a time at which the RF signal is output to the CMTS from the modulator after a delay time, and "$T_8$" indicates a time at which the RF signal output from the modulator finally arrives at the CMTS. Here, a difference may occur between a period of time "$S_1$" ($T_2-T_1$) during which the upstream burst signal of the STB1 arrives at the modulator from the ONT and a period of time "$S_2$" ($T_6-T_5$) during which the upstream burst signal of the STB2 arrives at the modulator from the ONT. The difference may occur because a packet delay occurs in an IP network.

Here, timing compensation may be performed on the upstream burst signals received by the modulator from each of the STB1 and the STB2 so that the upstream burst signals transmitted from the STB1 and the STB2 arrive at the CMTS at the same time. In FIG. 4, "$\tau_1$" and "$\tau_2$" are respective times to be compensated for.

For example, when a period of time during which a signal is transmitted from the ONT to the modulator is long, such a compensation time may be shortened. Conversely, when the period of time during which the signal is transmitted from the ONT to the modulator is short, the compensation time may be longer to have identical time intervals. In a case of the RF signal transmitted to the CMTS from the modulator, identical periods of time may be used in both cases of the STB1 and the STB2. Through such a timing compensation method, identical periods of time may be used for the transmission of the upstream burst for all the STBs.

As illustrated in FIG. 4, the timing compensation may be necessary for the arrival times of the upstream bursts transmitted from all the STBs to the CMTS to be consistently maintained. Thus, the transmission may be performed by adding timing information to the IP packet loaded with the upstream bursts transmitted from the ONT.

Figure 5:
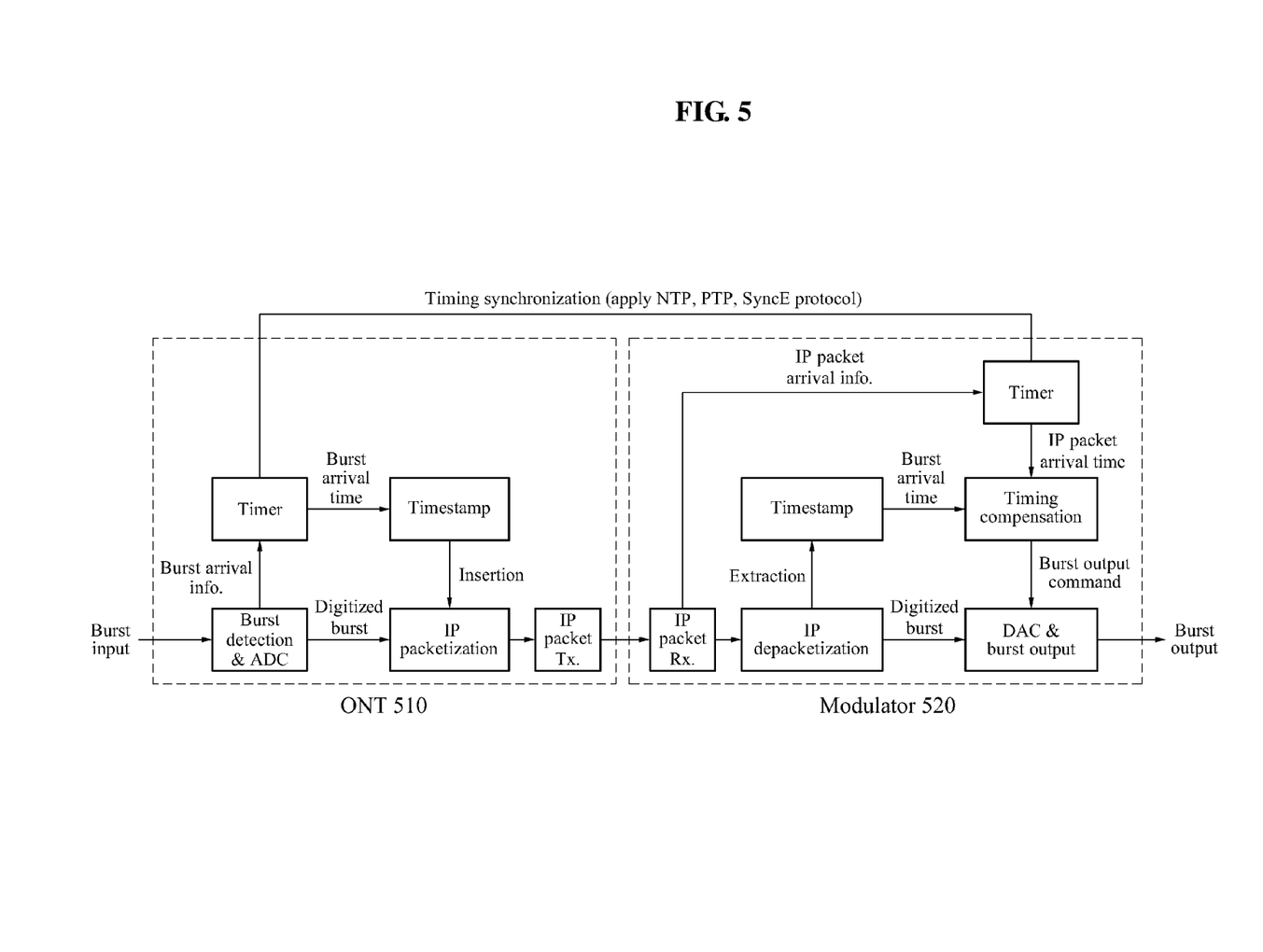
FIG. 5 is a diagram illustrating a timing compensation process in which timing information is inserted in an Internet protocol (IP) packet through which an upstream burst is transmitted from an ONT and a modulator of a headend uses the timing information according to an embodiment.

FIG. 5 is a diagram illustrating a timing compensation process in which timing information is inserted in an IP packet through which an upstream burst is transmitted from an ONT 510 and a modulator 520 of a headend uses the timing information according to an embodiment.

Referring to FIG. 5, synchronization between the ONT 510 located on a customer premises and the modulator 520 located at a headend may be performed using a network timing synchronization protocol, for example, an NTP, a PTP, and SyncE. Thus, identical times, for example, identical timer values, may be obtained between the ONT 510 and the modulator 520.

When an upstream burst signal is input to the ONT 510, the ONT 510 may detect the upstream burst signal and digitize the RF signal through ADC. Simultaneously, the ONT 510 may provide a notification of an arrival of the burst to a timer at a point in time when the burst is input, and the timer may record the arrival time of the burst as a timestamp. The recorded timestamp may be included in an IP packet along with digitized upstream burst data, and the IP packet may be transmitted.

When the IP packet associated with the upstream burst is input to the modulator 520 of the headend, the input information may be transferred to the timer and the timer may record an arrival time of the IP packet and transfer the recorded information to a timing compensation block. The timestamp and the digitized burst data may be extracted from the input IP packet, and the extracted timestamp and the extracted data may be transferred to the timing compensation block and a DAC and burst output block. The timing compensation block may obtain a difference between the arrival time of the IP packet and the timestamp extracted from the IP packet, for example, a time at which the upstream burst is input to the ONT 510, and calculate a period of time used for the transfer from the ONT 510 to the modulator 520. A delay time to be compensated for may be added to the transfer time to calculate a time at which the upstream burst is output from the modulator 520. The delay time may be applied to equalize transfer times used for transfer of all upstream bursts from the ONT 510 to a CMTS through the modulator 520 and thus, compensation may be differently performed for each upstream burst.

According to an embodiment, a process of setting a fixed transfer time, adding a compensation delay time to a period of time used for transfer from the ONT 510 to the modulator 520, and outputting a burst to the CMTS based on the set transfer time may be performed.

Through the process described with reference to FIG. 5, the transfer may be performed while maintaining timing synchronization in a process of transferring an upstream burst starting from the ONT 510 to the CMTS through the modulator 520 of the headend. Thus, upstream burst transmission which operates through TDMA may be enabled. In addition, RFoG may be applied by using an existing RF-based transmission apparatus and subscriber device, despite an evolution from a cable broadcasting network to an optical cable.

Figure 6:
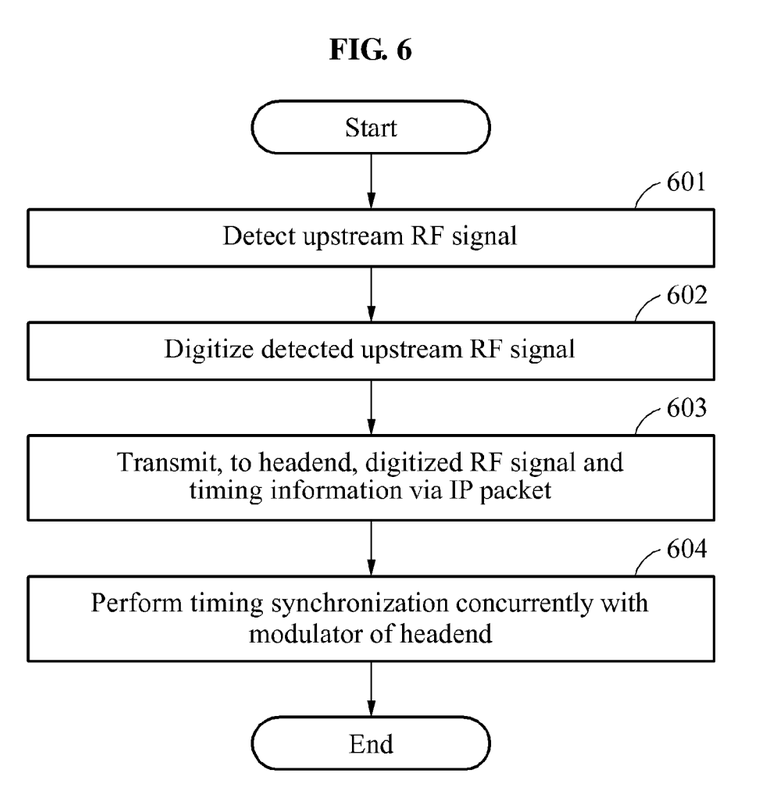
FIG. 6 is a flowchart illustrating a method of transmitting an upstream RF signal according to an embodiment.

FIG. 6 is a flowchart illustrating a method of transmitting an upstream RF signal according to an embodiment. Hereinafter, the method of transmitting an upstream RF signal will be simply referred to as an upstream RF signal transmitting method.

Referring to FIG. 6, in operation 601, the upstream RF signal transmitting method detects an upstream RF signal. In operation 602, the upstream RF signal transmitting method digitizes the detected upstream RF signal.

In operation 603, the upstream RF signal transmitting method transmits, to a headend, the digitized RF signal and timing information via an IP packet.

In operation 604, the upstream RF signal transmitting method performs timing synchronization concurrently with a modulator of the headend. The timing synchronization may be performed using at least one of an NTP, a PTP, and SyncE.

According to an embodiment, the upstream RF signal transmitting method may include transmitting, to the modulator, the digitized RF signal and the timing information generated from the timing synchronization, and performing the timing synchronization. Here, the modulator may receive the timing information, and generate and output a new RF signal to have a delay time based on the received timing information.

Figure 7:
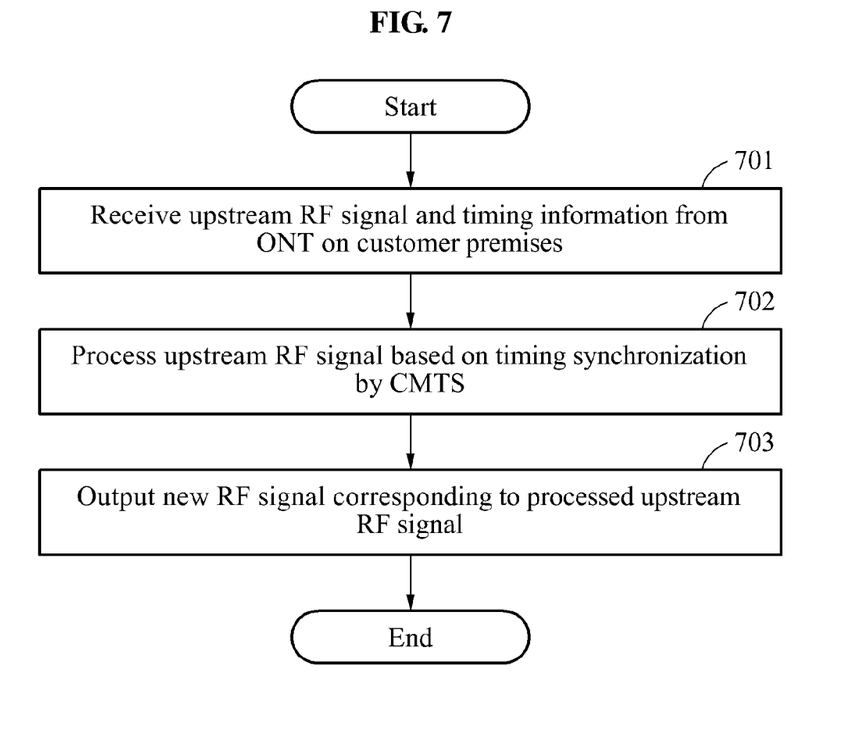
FIG. 7 is a flowchart illustrating a method of receiving an upstream RF signal according to an embodiment.

FIG. 7 is a flowchart illustrating a method of receiving an upstream RF signal according to an embodiment. Hereinafter, the method of receiving an upstream RF signal will be simply referred to as an upstream RF signal receiving method.

Referring to FIG. 7, in operation 701, the upstream RF signal receiving method receives an upstream RF signal and timing information from an ONT on a customer premises through a modulator. In operation 702, the upstream RF signal receiving method performs timing synchronization using the received timing information, and processes the upstream RF signal based on the timing synchronization by a CMTS. For example, the ONT may perform the timing synchronization along with the modulator using at least one of an NTP, a PTP, and SyncE.

The ONT on the customer premises may transmit, to the modulator, a digitized RF signal and the timing information generated from the timing synchronization, and perform the timing synchronization.

In operation 703, the upstream RF signal receiving method outputs a new RF signal corresponding to the processed RF signal.

According to example embodiments, construction costs may be reduced by using an existing STB of a subscriber and an RF signal-based broadcasting equipment, for example, a CTMS, used in an HFC network, despite a change from a cable broadcasting network to an optical cable network.

In addition, IP-based RF signal transmission may be enabled using a PON instead of optically modulating an upstream RF signal.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for transmitting an upstream radio frequency (RF) signal, the apparatus comprising:
    a detector configured to detect an upstream RF signal and time information of the upstream RF signal from a CM (Cable Modem); and
    a transmitter configured to digitize the upstream RF signal and transmit the digitized RF signal and the time information to a modulator of a headend through an Internet protocol (IP) packet; and
    wherein the modulator of the headend is configured to generate a RF signal to have a delay time from the digitized RF signal based on the time information and transmit the RF signal to a cable modem termination system (CMTS).

2. The apparatus of claim 1, wherein the transmitter configured to transmit time information of the upstream RF signal to the headend through the IP packet.

3. The apparatus of claim 2, wherein the time information is time at which the upstream RF signal is sent by the CM.

4. A method of transmitting an upstream radio frequency (RF) signal, the method comprising:
    detecting an upstream RF signal and time information of the upstream RF signal from a CM(Cable Modem);
    digitizing the upstream RF signal; and
    transmitting, to a modulator of a headend, the digitized RF signal and the timing information through an Internet protocol (IP) packet, and
    wherein the modulator of the headend is configured to generate a RF signal to have a delay time from the digitized RF signal based on the time information and transmit to a cable modem termination system (CMTS).

5. The method of claim 4, wherein the transmitting comprises:
    transmitting time information of the upstream RF signal to the headend through the IP packet.

6. The method of claim 5, wherein the time information is time at which the upstream RF signal is sent by the CM(Cable Modem).

7. An apparatus for receiving an upstream radio frequency (RF) signal, the apparatus comprising:
    a cable modem termination system (CMTS); and
    a modulator configured to receive an upstream RF signal and time information of the upstream RF signal from an optical network terminal (ONT) through an Internet protocol (IP) packet and generate a RF signal to have a delay time from the upstream RF signal based on the time information and transmit the RF signal to the CMTS.

8. The apparatus of claim 7, wherein the modulator configured to receive time information of the upstream RF signal through the IP packet.

9. The apparatus of claim 8, wherein the time information is time at which the upstream RF signal is sent by a CM(Cable Modem).

* * * * *